(12) United States Patent
Fabreguette

(10) Patent No.: US 7,662,455 B2
(45) Date of Patent: Feb. 16, 2010

(54) FABRIC PREPREG BY TWO DISTINCT THERMOSETTING MATRIXES

(75) Inventor: Julien Fabreguette, Cagnes sur Mer (FR)

(73) Assignee: Eurocopter, Marignane (FR)

( * ) Notice: Subject to any disclaimer, the term of this patent is extended or adjusted under 35 U.S.C. 154(b) by 650 days.

(21) Appl. No.: 10/590,347

(22) PCT Filed: Feb. 16, 2005

(86) PCT No.: PCT/FR2005/000361

§ 371 (c)(1),
(2), (4) Date: Oct. 5, 2006

(87) PCT Pub. No.: WO2005/092585

PCT Pub. Date: Oct. 6, 2005

(65) Prior Publication Data

US 2008/0171170 A1    Jul. 17, 2008

(30) Foreign Application Priority Data

Feb. 27, 2004   (FR) ................................. 04 01984

(51) Int. Cl.
  *B32B 9/00*    (2006.01)
  *B32B 33/00*   (2006.01)
  *B32B 7/12*    (2006.01)
  *D03D 11/00*   (2006.01)

(52) U.S. Cl. ..................... 428/40.1; 428/41.9; 428/343; 428/354; 428/355 R; 428/355 EP; 442/205

(58) Field of Classification Search .............. 428/40.1, 428/41.9, 41.8, 343, 354, 355 R, 355 EP; 442/205

See application file for complete search history.

(56) References Cited

U.S. PATENT DOCUMENTS

| 2,769,742 | A | 11/1956 | Helbing |
| 4,855,182 | A | 8/1989 | Ondrejas et al. |
| 5,508,096 | A | 4/1996 | Van Skyhawk |
| 2002/0079052 | A1 | 6/2002 | Zhou et al. |

FOREIGN PATENT DOCUMENTS

JP   09087400   3/1997

OTHER PUBLICATIONS

Database WPI Section Ch, Week 199629, Derwent Publications Ltd., London, GB; AN 1996-282071, XP002333838.

*Primary Examiner*—Patricia L Nordmeyer
(74) *Attorney, Agent, or Firm*—Young & Thompson

(57) ABSTRACT

The present invention relates to a preimpregnated main fabric (1') provided with reinforcement (2) having a bottom face (F') impregnated with a first thermosetting matrix (5) and a top face (F) impregnated with a second thermosetting matrix (6). The invention is remarkable in that the first and second thermosetting matrices (5, 6) have different physico-chemical and rheological properties.

8 Claims, 1 Drawing Sheet

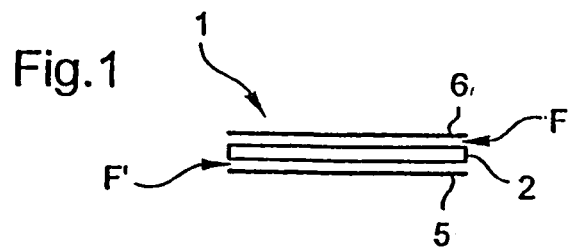
Fig. 1
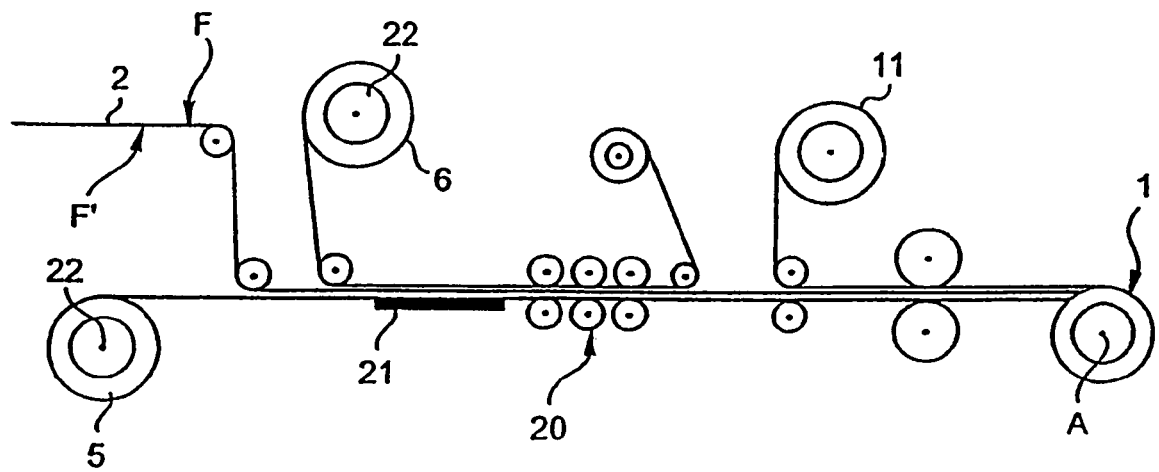
Fig. 2
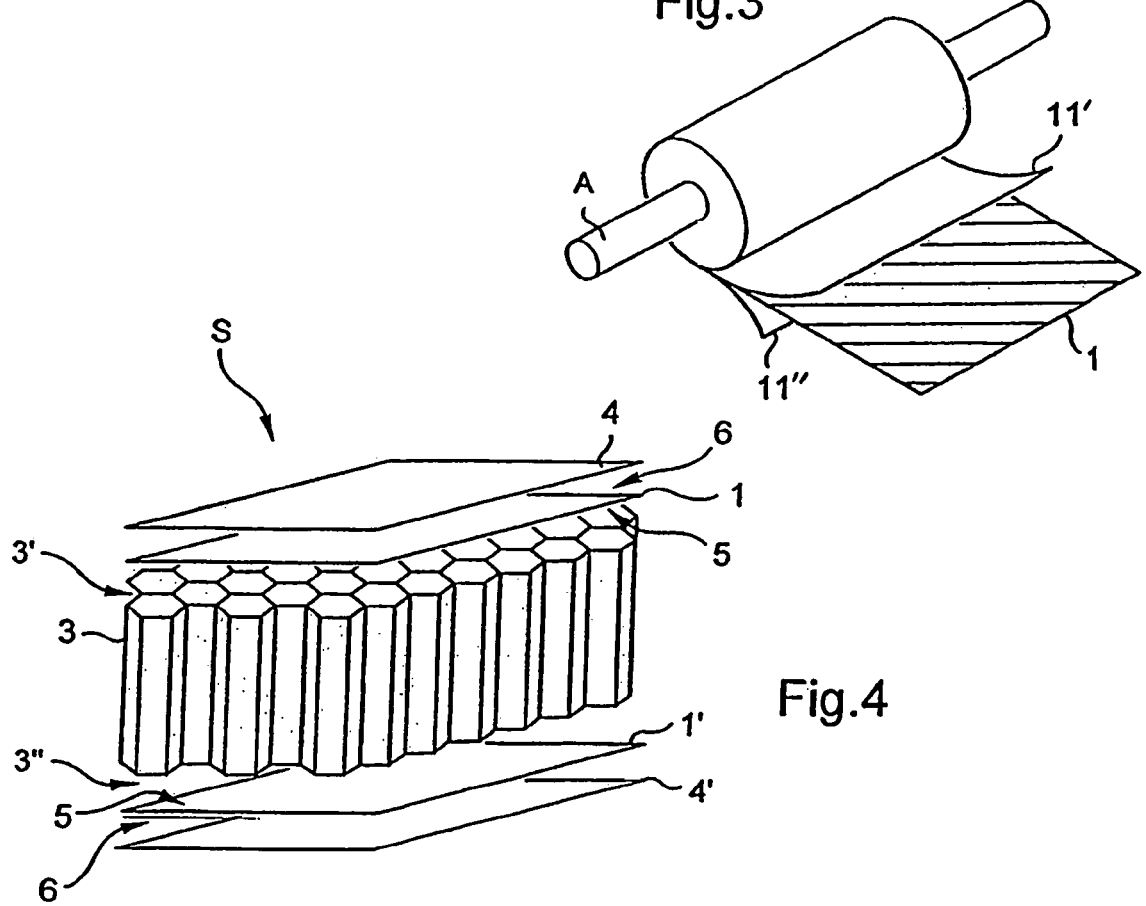
Fig. 3
Fig. 4 even with skins of small thickness. Nevertheless, as mentioned above, such self-adhesive preimpregnated fabrics are expensive and are not suitable for sandwich composite structures presenting skins of large thickness, i.e. having more than about ten plies.

FABRIC PREPREG BY TWO DISTINCT THERMOSETTING MATRIXES

The present invention relates to preimpregnated fabric for fabricating sandwich composite structures presenting high mechanical and environmental performance. The invention finds a particular application in the field of designing and fabricating composite aircraft structures that are subjected to large mechanical forces and to critical environmental conditions.

BACKGROUND OF THE INVENTION

Sandwich composite structures were introduced to the aviation industry because of their light weight, which makes it possible to reduce the weight of structures compared with structures made using metal materials. In addition, such composite structures present the advantage of avoiding any problem of corrosion.

The introduction in particular of composites constituted by preimpregnated fabric based on carbon fibers and thermosetting matrices implemented by molding in an autoclave or by means of a vacuum bag in a stove, has given satisfaction in particular in the field of aviation (fuselage, tail plane, tail fin, cowlings, blades, propellers, transmissions, suspension, ...). The mechanical characteristics (stiffness, strength) obtained with such composite materials when subjected both to static loading and to fatigue loading have been found to be at least equivalent and often better than the characteristics obtained with metal materials (light alloys, titanium, steel, ...) with a weight saving that can be as great as 30% in some cases.

In general, preimpregnated fabric is constituted by a nonpolymerized thermosetting matrix impregnating reinforcement at some determined impregnating weight fraction (generally 25% to 50%). The main preimpregnated fabrics commonly in use in the aviation industry are constituted by textile reinforcement based on glass, carbon, or aramid fibers, together with epoxy, phenolic, or bismaleimide resins.

Those preimpregnated fabrics are stored at temperatures close to −18° C. so as to avoid initiating the exothermic polymerization reaction of the impregnation matrix. They are cut to shape and laid manually or automatically at ambient temperature.

The operation of draping the composite structure consists in juxtaposing various plies of preimpregnated fabric in a sequence and at orientations that are well determined. The textile reinforcement of the various plies of preimpregnated fabric is preferably oriented in different directions (0°, ±45°, 90°, ...). These directions are defined essentially as a function of the nature of the mechanical loads to which the composite structure is subjected (traction, bending, shear, or other), and also as a function of the directions of said loads.

Once the various plies of preimpregnated fabric have been draped, they are subjected to molding in an autoclave or molding with a vacuum bag in a stove in order to obtain the final composite part.

The autoclave method is used for fabricating high quality structural parts having a high volume fraction of fibers, greater that or equal to 55%, and low porosity, less than 3%. The autoclave is a vessel under pressure in which the conditions for curing, polymerizing, or cross-linking the impregnation thermosetting matrix are optimized by controlling vacuum, pressure, rate of temperature rise, and curing temperature. Molding preimpregnated fabric in an autoclave is used in particular for molding composite parts that are thick and complex in shape. The vacuum bag method is more particularly suitable for composite parts that are thin and of large dimensions, and that do not require a high fiber volume fraction. Under such circumstances, the composite part is polymerized in a stove, in a vacuum, solely after a relatively short curing cycle.

A sandwich composite structure is made up of fine skins provided with a plurality of preimpregnated fabric plies positioned on either side of a core, the core being made of a foam-based material or being shaped as a honeycomb, for example. Bending, traction, and compression stresses are withstood by the skins, while shear stresses are withstood by the core. That type of architecture serves in particular to reduce significantly the weight of the final part while conserving a high level of mechanical performance. That type of sandwich construction presents stiffness and bending strength that are particularly great.

Nevertheless, one of the more common modes of mechanical failure inherent to that structural concept lies in the skins separating from the foam or honeycomb core. Bonding between the skins and the core is a key factor in ensuring structural mechanical integrity for the part. In the process of dimensioning a sandwich composite structure, a specific mechanical peeling test is performed in order to characterize the quality of the interface and the bonding between the skins and the core.

Amongst the preimpregnated fabrics that are used in constructing sandwich type composite structures, two distinct categories can be distinguished.

The prior art teaches firstly that a preimpregnated fabric has a single impregnation matrix having physico-chemical and rheological properties that are generally isotropic disposed on the top and bottom faces of reinforcement, the matrix not being self-adhesive. In the particular circumstance of sandwich composite structures, it is necessary to add a film of adhesive between each face of the core and each ply of preimpregnated fabric in contact with said faces, in order to obtain an interface of good quality. The adhesive film is generally expensive, and requires a prior processing step, thereby lengthening fabrication time. Furthermore, because of its large weight per unit area, which for epoxy type adhesives can lie in the range 300 grams per square meter (g/m$^2$) to 450 g/m$^2$, such an additional film of adhesive can sometimes increase the weight of the final sandwich composite structure significantly (up to as much as 30%). Those drawbacks of increasing weight and cost are particularly pronounced with skins of small thickness, i.e. possessing fewer than about ten preimpregnated fabric plies.

To remedy that type of problem preimpregnated fabrics having self-adhesive matrices on their top and bottom faces have been formulated and are commonly used for producing sandwich composite parts.

Nevertheless, they remain rather expensive because of the specific ingredients introduced in their formulation in order to obtain self-adhesive properties. Those self-adhesive preimpregnated fabrics are used above all for skins of small thickness, generally constituted by fewer than about ten plies of preimpregnated fabric.

Self-adhesion results from adding one or more plasticizers which combine with the various monomers and setting agents of the non-cross-linked thermosetting prepolymer of the matrix. They enable the matrix to have viscosity and rheological properties that encourage bonding between the preimpregnated fabrics and the core, when the polymerization reaction begins.

Those preimpregnated fabrics constituted by an self-adhesive matrix including such plasticizers thus enable sandwich composite structures to be obtained without an adhesive film at the interface between the skins and the core of foam or honeycomb, thereby reducing the weight thereof.

Unfortunately, by reducing in particular the cross-linking density in the three-dimensional lattice, those plasticizers lower the glass transition temperature and also lower the mechanical performance of the composite structure at high temperature. The glass transition temperature of a composite constitutes a characteristic that is essential for dimensioning it relative to its environment. When the external temperature becomes higher than the glass transition temperature of the cross-linked matrix, then the stiffness of the composite collapses quickly.

OBJECTS AND SUMMARY OF THE INVENTION

An object of the present invention is to provide a preimpregnated fabric enabling an organic sandwich composite structure to be obtained that is of small thickness and that presents excellent mechanical properties at high temperatures and at the interface between the skins and the core. It also provides significant savings in weight and enables production costs to be reduced compared with the various technological solutions of the prior art, insofar as it is no longer necessary to interpose a specific film of adhesive between the first ply of preimpregnated fabric and each of the faces of the foam or honeycomb core.

These advantages are particularly important when designing and fabricating composite aircraft parts, and in particular parts for helicopters where there are severe constraints in terms of lightness, ability to withstand the environment, and to withstand high temperatures, and in which there are also severe requirements in terms of mechanical performance both under static loading and under fatigue loading.

According to the invention, a preimpregnated fabric, referred to below as a "preimpregnated main fabric" for reasons of convenience, is provided with reinforcement having a bottom face impregnated with a first thermosetting matrix and a top face impregnated with a second thermosetting matrix. In addition, the preimpregnated main fabric is remarkable in that the first and second thermosetting matrices have different physico-chemical and rheological properties.

The preimpregnated main fabric is thus constituted by reinforcement, in particular of carbon, glass, or aramid fibers, impregnated by two thermosetting organic matrices, e.g. of the epoxy type, having different physico-chemical and rheological properties. Each matrix impregnates the reinforcement into its thickness and is disposed on a respective one of the faces thereof. The two matrices present different values in particular for the start-of-gelling temperature, for reaction kinetics (polymerization speed, density of three-dimensional bridging, . . . ), for specific heat and enthalpy of polymerization, and for viscosity as a function of time and of temperature.

In addition, the first thermosetting organic matrix is advantageously self-adhesive while the second matrix is not self-adhesive.

Furthermore, it is particularly important for the top and bottom faces to be clearly identified so that an operator makes correct use of the preimpregnated main fabric. Under such circumstances, at least one of the top and bottom faces advantageously includes mistake-proofing means, consequently reducing the risk of error.

The mistake-proofing means consist in a tracer such as a thread introduced into the thermosetting matrix of the top or bottom face, or else it is constituted by a dye. In the particular circumstance of using a respective dye for each of the top and bottom faces, the dyes present first and second colors respectively for the top and bottom faces.

The invention also provides a sandwich composite structure provided with a foam or honeycomb core disposed between a top skin and a bottom skin. The sandwich composite structure is remarkable in that a first ply of preimpregnated main fabric is arranged between the core and the top skin, and in that a second ply of preimpregnated main fabric is arranged between the core and the bottom skin, the self-adhesive thermosetting first matrix of each of the first and second plies of preimpregnated main fabric coming into contact with the core.

In this configuration, the self-adhesive bottom faces of the first and of the second plies of preimpregnated main fabric are disposed on surfaces of the core that is to be covered, thereby serving to optimize the mechanical and physico-chemical interface between the skins and the core, while omitting any heavy and expensive film of adhesive. Adhesion between the skins and the core, and also resistance to peeling, are high insofar as the connection meniscus between the hexagonal cells of the honeycomb for example, and the ply of preimpregnated main fabric is improved by the presence of one or more plasticizers.

Furthermore, the non-self-adhesive top face of the first or the second ply of preimpregnated main fabric is in contact with a non-self-adhesive preimpregnated secondary fabric forming part of the bottom or top skin. This enables good chemical compatibility and good mechanical performance at high temperature to be obtained.

In addition, the non-self-adhesive second matrix of the first and second plies of preimpregnated main fabric is advantageously identical to the matrix of the non-self-adhesive preimpregnated secondary fabrics constituting the skins of the sandwich structure.

Under such conditions, the glass transition temperature and the high-temperature mechanical performance of the sandwich composite structure are not degraded.

The sandwich composite structure as constituted in this way by interposing a ply of preimpregnated main fabric between the core and the skins possesses excellent mechanical properties at high temperature, in particular in bending, in shear, in traction, and in compression, and also presents reduced weight and fabrication costs.

Furthermore, the mistake-proofing means of the preimpregnated main fabric enables an operator to ensure that it is indeed the self-adhesive thermosetting first matrix of the first and second plies of preimpregnated main fabric that comes into contact with the foam or honeycomb core of the structure.

In addition, the operator can guarantee complete absence of error in fabrication with the help of inspection means.

Thus, conventional detection means can be used to detect and locate a tracer arranged in the thermosetting first matrix after the sandwich composite structure has been cured.

In the same spirit, the operator advantageously verifies the quality of adhesion of the plies of the preimpregnated main fabric on the core by subjecting the structure to calibrated suction, the plies of preimpregnated main fabric should then not come unstuck, providing they have been placed properly.

Whatever the method used, the operator can thus demonstrate that the sandwich composite structure has been fabricated correctly.

BRIEF DESCRIPTION OF THE DRAWING

Other features and advantages of the present invention appear from the following description of an embodiment given with reference to the figures, in which:

FIG. 1 is a section through a preimpregnated fabric of the invention;

FIG. 2 is a diagram of the method of fabricating a preimpregnated fabric of the invention;

FIG. 3 is an isometric view of a roll of preimpregnated fabric of the invention; and FIG. 4 is a view of a sandwich composite structure of the invention.

MORE DETAILED DESCRIPTION

FIG. 1 is a section view of a preimpregnated main fabric 1 of the invention enabling sandwich composite structures to be obtained that present high mechanical and environmental performance at low production cost and at reduced weight.

The preimpregnated main fabric 1 comprises reinforcement 2 based on glass, carbon, or aramid fibers, for example. In addition, the reinforcement 2 is provided with first and second thermosetting matrices 5 and 6, i.e. matrices that become cross-linked under the action of heat, the matrices having different physico-chemical and rheological properties. In particular, the first and second thermosetting matrices 5 and 6 present differing values for the start-of-gelling temperature, for reaction kinetics (polymerization speed, density of three-dimensional bridging, ... ), for specific heat and enthalpy of polymerization, and for viscosity as a function of time and temperature. The matrices which are of the epoxy, phenolic, bismaleimide, or polyimide resin type are constituted, for example, by matrices of the kind commonly used in the aviation industry.

More precisely, the first matrix 5 arranged on the bottom face F' of the reinforcement 2 is advantageously made to be self-adhesive by having one or more plasticizers introduced therein. In contrast, the second matrix 6 arranged on the top face F of the reinforcement 2 is of the non-self-adhesive type.

FIG. 2 is a diagram of the process for fabricating a preimpregnated main fabric 1 of the invention.

This preimpregnated main fabric 1 is constituted using first and second matrices 5 and 6 having different formulations. It can be fabricated using the method known to the person skilled in the art as the "hot-melt" method.

The self-adhesive first matrix 5 and the non-self-adhesive second matrix 6 are deposited separately in film form on laminating rolls 22.

Firstly, the first and second matrices 5 and 6 are unrolled on either side of the reinforcement 2, so as to be arranged respectively on the bottom face F' and the top face F of the reinforcement 2. The resulting assembly is then heated by a member 21 to a temperature that is lower than the temperature that corresponds to the beginning of cross-linking in either of the matrices. This heating stage serves to lower the viscosities of the first and second matrices 5 and 6 without causing the polymerization reaction to start.

Thereafter, the first and second matrices 5 and 6 that are of calibrated thickness are caused to penetrate into the core of the reinforcement by passing through calendaring rolls 20 so as to impregnate respectively the bottom and top faces F' and F of the reinforcement 2. Different settings for the temperature and calendaring thickness can be used so as to be able to implement a plurality of types of thermosetting matrix (epoxy, ... ). The parameters that it is essential to control when fabricating the preimpregnated main fabric 1 are the weight per unit area of the reinforcement 2 and the impregnation weight fractions of the first and second matrices 5 and 6.

At the end of this operation, a removable separator sheet 11 is placed on the top face F of the preimpregnated main fabric 1 before it is rolled onto a roller A.

The separator sheet 11 acts as mistake-proofing means, since it serves to clearly identify the top face F. Naturally, it should be observed that the separator sheet could alternatively be placed on the bottom face F' by appropriately adapting the device.

FIG. 3 is an isometric view of a roller A carrying a roll of preimpregnated main fabric 1 of the invention. In this variant, the preimpregnated main fabric 1 is inserted between first and second removable separator sheets 11', 11" made of silicone-impregnated paper and wound around a shaft to form a reel that is stored in a cold chamber so as to avoid triggering the reaction kinetics of matrix polymerization.

In this configuration, the first and second separator sheets 11', 11" are preferably different from each other so as to represent mistake-proofing means enabling an operator clearly to identify the bottom face which is impregnated with the first thermosetting matrix that is self-adhesive and the top face which is impregnated with the second thermosetting matrix that is non-self-adhesive. The first and second separator sheets 11', 11" could then, for example, be of colors that are different or they could present different symbols on their visible faces.

FIG. 4 shows a sandwich composite structure S of the invention, for which the mechanical characteristics in terms of temperature, and in particular the adhesion of the skins 4, 4' with the core 3, and production costs have been optimized by interposing first and second preimpregnated main fabrics 1 and 1'.

The core 3 of this sandwich composite structure is constituted by an element shaped as a honeycomb. The top and bottom skins 4 and 4' of composite material are built up by draping a plurality of secondary fabrics, each impregnated with a single non-self-adhesive matrix. The reinforcement in these secondary fabrics is preferably oriented in a plurality of different directions (0°, ±45°, 90°, ... ). These directions are defined essentially as a function of the nature of the mechanical loads (traction, bending, shear, ... ) to which the composite part is to be subjected, and of the directions of said loads.

The preimpregnated main fabrics 1, 1' constitute semi-finished draping materials for draping respectively on the top and bottom faces 3' and 3" of the core 3. The first thermosetting matrix 5 of each of these preimpregnated main fabrics 1, 1' is placed against the core 3. At the beginning of the polymerization reaction that is triggered in an autoclave or in a stove, the combination of components of the matrix 5, i.e. one or more plasticizers and thermosetting prepolymers, serves to obtain viscosity that is appropriate for forming connection meniscuses between the core 3 and the preimpregnated main fabrics 1, 1'. The bonding between the skins 4, 4' and the core 3 is thus optimized without an adhesive film.

In addition, the second thermosetting matrix 6 of each of these preimpregnated main fabrics 1, 1' comes respectively into contact with the non-self-adhesive secondary fabric making up the top and bottom skins 4 and 4'. Advantageously, the impregnation matrix of these secondary fabrics is identical to the second thermosetting matrix 6.

Naturally, the present invention can be implemented in a wide variety of ways. Although one embodiment is described above, it will readily be understood that it is not conceivable to identify exhaustively all possible embodiments. It is naturally possible to envisage replacing any of the means described by equivalent means without thereby going beyond the ambit of the present invention.

What is claimed is:

1. A preimpregnated main fabric (1, 1') provided with reinforcement (2) having a bottom face (F') impregnated with a first thermosetting matrix (5) and a top face (F) impregnated with a second thermosetting matrix (6), wherein said first and second thermosetting matrices (5 and 6) have different physico-chemical and rheological properties, said first thermosetting matrix (5) presenting self-adhesive properties and said second thermosetting matrix (6) presenting non-self-adhesive properties.

2. A preimpregnated main fabric according to claim 1, wherein at least one of said top and bottom faces (F, F') includes mistake-proofing means.

3. A preimpregnated main fabric according to claim 2, wherein said mistake-proofing means comprises a dye.

4. A preimpregnated main fabric according to claim 2, wherein said mistake-proofing means comprises a separator sheet (11) arranged on said top face (F).

5. A preimpregnated main fabric according to claim 2, wherein said mistake-proofing means comprises a separator sheet arranged on said bottom face (F').

6. A preimpregnated main fabric according to claim 2, wherein said mistake-proofing means comprises first and second removable separator sheets (11', 11") that are different from each other, and that cover said top and bottom faces (F, F') respectively.

7. A sandwich composite structure (S) provided with a foam or honeycomb core (3) arranged between a top skin (4) and a bottom skin (4'), wherein a first ply of a preimpregnated main fabric (1) according to claim 1 is arranged between the core (3) and the top skin (4), and wherein a second ply of the preimpregnated main fabric (1') is arranged between the core (3) and the bottom skin (4'), the self-adhesive first thermosetting matrix (5) of each of said first and second plies (1, 1') of preimpregnated main fabric coming into contact with the core (3).

8. A sandwich composite structure according to claim 7, wherein the non-self-adhesive second matrix (6) of the first and second plies (1, 1') of the preimpregnated main fabric is identical to the matrix of the non-self-adhesive secondary fabrics of the top and bottom skins (4, 4').

* * * * *

UNITED STATES PATENT AND TRADEMARK OFFICE
CERTIFICATE OF CORRECTION

PATENT NO. : 7,662,455 B2
APPLICATION NO. : 10/590347
DATED : February 16, 2010
INVENTOR(S) : Julien Fabreguette It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 804 days.

Signed and Sealed this

Fourth Day of January, 2011

David J. Kappos
*Director of the United States Patent and Trademark Office*